(12) United States Patent
James

(10) Patent No.: US 9,376,607 B2
(45) Date of Patent: Jun. 28, 2016

(54) COMPOSITIONS AND METHODS FOR COMPLETING SUBTERRANEAN WELLS

(75) Inventor: Simon James, Le Plessis-Robinson (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 259 days.

(21) Appl. No.: 13/131,351

(22) PCT Filed: Dec. 3, 2009

(86) PCT No.: PCT/EP2009/008658
§ 371 (c)(1),
(2), (4) Date: May 26, 2011

(87) PCT Pub. No.: WO2010/069479
PCT Pub. Date: Jun. 24, 2010

(65) Prior Publication Data
US 2011/0290493 A1 Dec. 1, 2011

(30) Foreign Application Priority Data

Dec. 16, 2008 (EP) ..................................... 08171854

(51) Int. Cl.
| | |
|---|---|
| *C09K 8/08* | (2006.01) |
| *C04B 28/02* | (2006.01) |
| *C04B 28/00* | (2006.01) |
| *C04B 28/06* | (2006.01) |
| *C04B 28/08* | (2006.01) |
| *C09K 8/12* | (2006.01) |
| *C09K 8/487* | (2006.01) |

(Continued)

(52) U.S. Cl.
CPC ............... *C09K 8/08* (2013.01); *C04B 28/006* (2013.01); *C04B 28/02* (2013.01); *C04B 28/06* (2013.01); *C04B 28/08* (2013.01); *C09K 8/12* (2013.01); *C09K 8/487* (2013.01); *C09K 8/508* (2013.01); *C09K 8/516* (2013.01); *C04B 2103/0065* (2013.01); *C04B 2103/46* (2013.01); *C04B 2111/00146* (2013.01); *Y02P 40/165* (2015.11)

(58) Field of Classification Search
None
See application file for complete search history.

(56) References Cited

U.S. PATENT DOCUMENTS 2,621,132 A * 12/1952 Jan Saal ......................... 106/660
2,779,735 A * 1/1957 Brown et al. .................. 507/135

(Continued)

FOREIGN PATENT DOCUMENTS

GB 2066827 7/1981

OTHER PUBLICATIONS

Foundations of Chemistry, Mixtures; The University of Memphis Department of Chemistry; http://www.chem.memphis.edu/bridson/FundChem/T05a1100.htm.*

(Continued)

*Primary Examiner* — Angela M DiTrani
*Assistant Examiner* — Anuradha Ahuja
(74) *Attorney, Agent, or Firm* — Jeremy D. Tillman; Michael Flynn; Tim Curington

(57) ABSTRACT

Disclosed are compositions and methods for providing fluid-loss control in subterranean wells. Well-completion fluids contain fine particulate additives whose glass-transition temperatures are below the anticipated bottomhole temperature. The particles soften upon injection into the well, whereupon they soften and become deformable. The particles then migrate to the borehole wall and form a seal that reduces further fluid flow from the borehole into the formation. The additive may be supplied as a powder or in the form of a liquid suspension.

14 Claims, 1 Drawing Sheet

(51) Int. Cl.
*C09K 8/508* (2006.01)
*C09K 8/516* (2006.01)
*C04B 103/00* (2006.01)
*C04B 103/46* (2006.01)
*C04B 111/00* (2006.01)

(56) References Cited

U.S. PATENT DOCUMENTS

| | | | |
|---|---|---|---|
| 3,021,291 A * | 2/1962 | Thiessen | 521/56 |
| 3,046,222 A * | 7/1962 | Phansalkar et al. | 166/283 |
| 3,316,965 A | 5/1967 | Watanabe | |
| 3,455,390 A * | 7/1969 | Gallus | 166/295 |
| 3,709,819 A | 1/1973 | Browning et al. | |
| 3,753,903 A | 8/1973 | Fischer et al. | |
| 3,882,029 A | 5/1975 | Fischer | |
| 3,979,305 A | 9/1976 | Fischer | |
| 4,385,999 A | 5/1983 | McCrary | |
| 4,537,918 A | 8/1985 | Parcevaux et al. | |
| 6,508,305 B1 * | 1/2003 | Brannon et al. | 166/293 |
| 6,569,234 B2 * | 5/2003 | Yamashita et al. | 106/696 |
| 6,902,002 B1 | 6/2005 | Chatterji | |
| 2004/0147406 A1 * | 7/2004 | Go Boncan | 507/200 |
| 2004/0251026 A1 * | 12/2004 | Dargaud et al. | 166/292 |
| 2005/0205258 A1 * | 9/2005 | Reddy et al. | 166/292 |
| 2006/0272819 A1 * | 12/2006 | Santra et al. | 166/292 |
| 2007/0084600 A1 | 4/2007 | Braden | |
| 2007/0238623 A1 * | 10/2007 | Saini et al. | 507/219 |
| 2007/0244013 A1 | 10/2007 | Hoskins | |
| 2008/0017377 A1 | 1/2008 | Cowan | |
| 2012/0015852 A1 * | 1/2012 | Quintero et al. | 507/112 |

OTHER PUBLICATIONS

Daccord G, Craster B, Ladva H, Jones TGJ and Manescu G: "Cement-Formation Interactions," in Nelson EB and Guillot D (eds.): Well Cementing-2nd Edition. Houston: Schlumberger (2006): 191-232.

Nelson EB, Michaux M and Drochon B: "Cement Additives and Mechanisms of Action," in Nelson EB and Guillot D (eds.): Well Cementing-2nd Edition. Houston: Schlumberger (2006): 49-91.

Nelson EB, Drochon B, Michaux M and Griffin TJ: "Special Cement Systems," in Nelson EB and Guillot D (eds.): Well Cementing-2nd Edition. Houston: Schlumberger (2006): 233-268.

Reddy BR: "Novel Low Heat-of-Hydration Cement Compositions," paper SPE 114927, presented at the CIPC/SPE Gas Technology Symposium Joint Conference, Calgary, Alberta, Jun. 16-19, 2008.

International Search Report for the equivalent PCT patent application No. PCT/EP2009/008658 issued on Mar. 22, 2010.

* cited by examiner

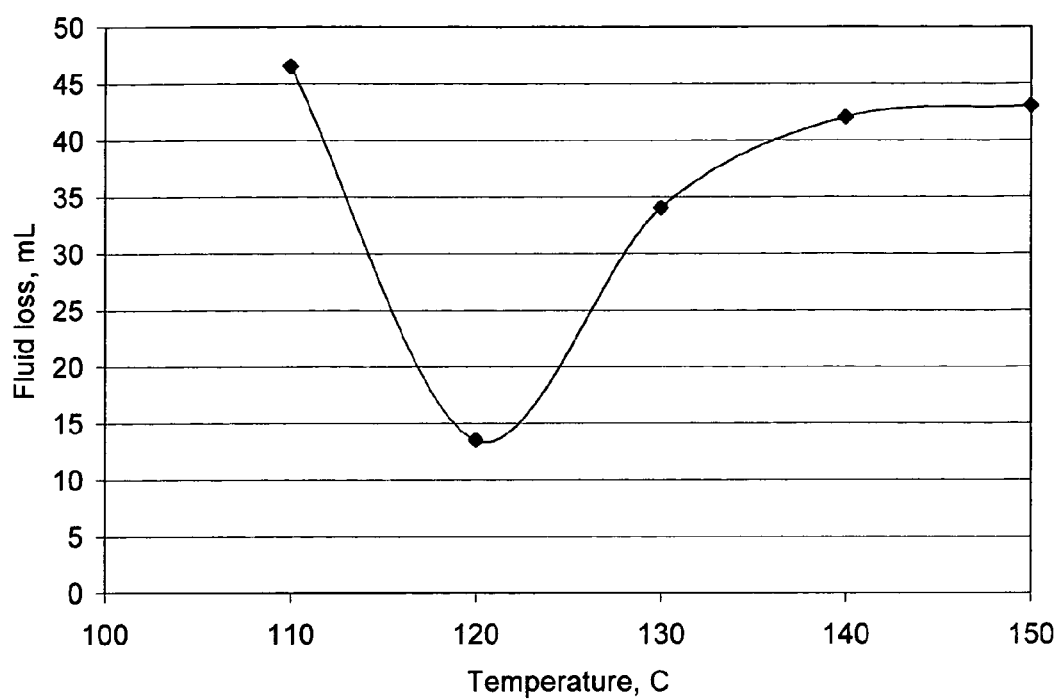

COMPOSITIONS AND METHODS FOR COMPLETING SUBTERRANEAN WELLS

BACKGROUND OF THE INVENTION

The statements in this section merely provide background information related to the present disclosure and may not constitute prior art.

This invention relates to compositions and methods for completing subterranean wells, in particular, fluid compositions and methods for completion operations during which the fluid compositions are pumped into a wellbore and make contact with subterranean rock formations.

In the course of completing oil and gas wells and the like, various types of fluids are circulated in the wellbore. These fluids will hereinafter be called "process fluids." Process fluids include, but are not limited to, drilling fluids, spacer fluids and cement slurries. In addition, these fluids typically contain solid particles. Fluid hydrostatic pressure and pumping pressure create a pressure differential between the wellbore and the surrounding formation rock. As a result, the liquid portion of the fluid has a tendency to enter pores in the subterranean rock, migrate away from the wellbore, and leave the solid particles behind. In other words, a filtration process occurs that is commonly known in the art as "fluid loss."

Excessive fluid loss may have undesirable consequences. For example, as more and more liquid exits the wellbore and penetrates the subterranean rock, the solids left behind may concentrate and form a plug, preventing further fluid flow in the wellbore and terminating the completion process prematurely. Liquid entering the formation rock may interact with minerals such as clays, causing the rock to lose permeability—a condition known in the art as "formation damage." The rheological and chemical properties of a completion-fluid system may also be sensitive to the ratio between the liquid and solid ingredients. Disruption of the optimal liquid-solid ratio arising from fluid loss may have a detrimental effect on the completion process and cause failure.

Control of fluid loss is particularly important during primary and remedial well-cementing operations. The goal of primary cementing is to pump a cement slurry in the well and fill the annular space between a casing string and the subterranean rock. The slurry may be pumped down through the casing interior and up the annulus, or vice versa. When the cement slurry hardens, it supports the casing in the well and provides a hydraulic seal between formation strata. Fluid-loss control during primary cementing is necessary to control the rheological properties of the cement slurry, to ensure that chemical reactions in the slurry proceed properly, and to obtain a durable hardened cement that will provide hydraulic isolation throughout the life of the well.

Remedial cementing consists of two main procedures—plug cementing and squeeze cementing. Fluid-loss control is particularly pertinent to squeeze cementing. Squeeze cementing is a process for restoring hydraulic isolation. A cement slurry is pumped downhole to seal casing leaks or voids behind the casing that have allowed hydraulic communication between formation strata. Squeeze cementing involves injecting a cement slurry into strategic locations that are often very small. Fluid-loss control is necessary to avoid premature solids bridging, and to ensure that the cement slurry arrives and hardens at the correct location.

Persons skilled in the art will distinguish the fluid-loss process from "lost circulation." Unlike fluid loss, wherein the liquid phase of the slurry escapes into the formation and leaves the solids behind, lost circulation is the loss of the entire slurry to cracks, voids or fissures in the formation. The fluid attributes required to treat lost circulation differ significantly from those aimed at controlling fluid loss. This distinction is detailed in: Daccord G, Craster B, Ladva H, Jones T G J and Manescu G: "Cement-Formation Interactions," in Nelson E B and Guillot D (eds.): *Well Cementing-$2^{nd}$ Edition*. Houston: Schlumberger (2006): 191-232.

Persons skilled in the art will also appreciate that the fluid-loss-additive requirements in the context of well construction are different from those associated with well stimulation. Fluid-loss additives in well-stimulation fluids are usually designed to be non-damaging—that is, they leave little or no impairment of formation permeability in their wake. Such additives often dissolve or melt after a stimulation treatment, leaving little or no residue behind. Formation damage is less relevant in the context of well-construction fluids, mainly because the solids content of these fluids is far higher than that of well-stimulation fluids. In addition, perforating operations are usually performed after well-construction operations. The resulting perforations penetrate sufficiently far into the formation to bypass damage that may have occurred upon exposure to well-construction fluids. Therefore, there is no need for the fluid-loss additives to dissolve or melt.

Most well-cementing operations employ aqueous cement systems based on Portland cement. These systems may contain solid extenders such as fly ash, blast-furnace slag, silica, clays and zeolite minerals. Recently, manufacturers began offering "composite cements," wherein materials such as fly ash blast-furnace slag and zeolites are either interground with Portland-cement clinker or blended with finished Portland cement.

Other aqueous compositions that are used less frequently include calcium aluminate cement, Class C fly ash, blends of lime and silica, chemically activated phosphate ceramics, alkali activated blast-furnace slags and geopolymers. The term cement is broadly used herein to include these aqueous well compositions as well as hydraulic and Portland-base systems generally. In addition, drilling fluids are available that, after drilling is completed and casing is lowered into the well, may be chemically activated and converted into a cement.

The cement systems described herein, as well as other process fluids, are subject to fluid-loss difficulties. It is therefore desirable to provide means by which fluid loss may be controlled.

SUMMARY OF THE INVENTION

The present invention relates to compositions that control the rate at which fluid loss occurs in a subterranean well. In addition, methods are disclosed for applying the compositions.

The first aspect of the invention is a composition for providing fluid-loss control in a subterranean well. The composition comprises a particulate additive, such as a fine particulate thermoplastic or wax, which becomes deformable at temperatures lower than the bottomhole temperature. Upon injection into the well, the additive particles become deformable and, upon migration to and deposition onto the borehole wall, form a seal that reduces further fluid ingress into the formation.

The second aspect of the invention is a method for controlling fluid loss in a subterranean well. The method comprises preparing a process fluid comprising a composition described by the first aspect of the invention, and pumping the process fluid into the well. After injection into the well, the particulate additive of the composition becomes deformable at a temperature below the bottomhole temperature and migrates to the borehole wall, thereby forming a seal that reduces fluid ingress through the borehole wall and into the formation.

In a third aspect, the invention aims at a method of cementing a subterranean well. A pumpable aqueous cement-slurry composition is prepared that contains a cement, water and a particulate thermoplastic or wax additive that becomes deformable at temperatures below the bottomhole temperature. The cement slurry is then pumped into the well, and the additive becomes deformable upon heating in the well. When fluid loss commences, the additive migrates to the borehole wall and forms a seal that reduces further fluid ingress into the formation.

BRIEF DESCRIPTION OF THE DRAWINGS

For a more complete understanding of the present invention, and the advantages thereof, reference is now made to the following descriptions taken in conjunction with the accompanying FIGURE, in which:

FIG. 1 is a graph that illustrates the effect of temperature on stirred fluid-loss control provided by a polyethylene-wax suspension in a cement slurry.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

Fluid-loss control is an important performance parameter of process fluids employed during well-construction operations. The current application discloses compositions that employ fine particulate additives to provide fluid-loss control, and methods by which the compositions may be applied to provide fluid-loss control in a subterranean well.

The first aspect of the invention describes a composition for providing fluid-loss control in a subterranean well. The composition comprises a particulate additive with certain preferred characteristics that include: (1) little or no solubility in water at ambient temperature; (2) particle size preferably smaller than 1 micrometer, and more preferably smaller than 0.5 micrometer; and (3) glass-transition temperature or melting temperature higher than or equal to 25° C. The additive particles may be delivered in the form of a powder; however, delivery in the form of an aqueous suspension or emulsion is preferred.

The additive particles are preferably selected such that their glass-transition temperatures and/or melting temperature are lower than the bottomhole temperature in the well.

The additives primarily comprise thermoplastics, waxes or both. The waxes are preferably chosen from the group comprising paraffin waxes, Fischer-Tropsch waxes, polyethylene waxes, Carnauba wax and polypropylene waxes. Polypropylene and polyethylene are suitable thermoplastic materials. When a well-completion fluid containing the additive particles is pumped into the well, and fluid loss commences, the deformable additive particles migrate to the borehole wall and form a seal that retards further liquid ingress into the formation rock.

Paraffin waxes and Fischer-Tropsch waxes typically have melting temperatures in the range between about 50° C. and 100° C. These products provide fluid-loss control as long as they remain in particulate form; however, fluid-loss control improves as the particles soften and become deformable as the temperature approaches the melting point. Above the melting point, the molten wax no longer provides a significant level of fluid-loss control. In other words, the API fluid-loss rate exceeds about 300 mL.

The glass transition temperature of polyethylene is very low, approximately −125° C.; however, depending upon the type of polyethylene, the melting point varies between 110° C. and 138° C. Optimal performance is observed in the temperature region near the melting point.

Additional thermoplastics envisioned in the invention include polyetheretherketone (PEEK), polyethersulfone (PES) and polytetrafluoroethylene (PTFE). PEEK has a melting point in the vicinity of 350° C., and the melting point of PTFE is near 330° C. PES has a glass-transition temperature near 225° C.

The composition may further comprise a hydraulic cement, a chemically bonded phosphate ceramic or a geopolymer. Hydraulic cements include (but are not limited to) Portland cement, calcium aluminate cement, Class C fly ash, lime-silica mixtures, Portland cement-fly ash composites, Portland cement-blast furnace slag composites and Portland cement-zeolite composites.

The second aspect of the invention is a method for controlling fluid loss in a subterranean well. The method comprises preparing a process fluid comprising a composition described by the first aspect of the invention, and pumping the process fluid into the well. After injection into the well, the particulate additive of the composition becomes deformable at a temperature below the bottomhole temperature and migrates to the borehole wall, thereby forming a seal that reduces fluid ingress through the borehole wall and into the formation. The preferred particulate-additive concentration in the process fluid may be between about 1% and 25% by weight of the liquid phase.

The third aspect of the invention is a method for cementing a subterranean well. A pumpable aqueous cement-slurry composition is prepared that comprises a cement, water and a particulate additive comprising thermoplastics, waxes or both. The cement slurry is pumped down the casing and up the annulus between the casing and the borehole wall, or vice versa. The particulate additive becomes deformable upon heating in the well. When fluid loss commences, the additive migrates to the borehole wall and forms a seal that reduces further fluid ingress into the formation. Note that primary cementing often involves multiple cement-slurry stages that are pumped sequentially. It may not be necessary for all of the stages to contain the thermoplastic or wax additive.

The particulate additive preferably has certain characteristics that include: (1) little or no solubility in water at ambient temperature; (2) particle size preferably smaller than 1 micrometer, and more preferably smaller than 0.5 micrometer; and (3) glass-transition temperature or melting temperature higher than or equal to 25° C. The additive particles may be delivered in the form of a powder; however, delivery in the form of an aqueous suspension or emulsion is preferred.

The additive particles are preferably selected such that their glass-transition temperatures and/or melting temperature are lower than the bottomhole temperature in the well. The preferred additive concentration in the process fluid may be between about 1.0% and 25% by weight of the liquid phase. The cement may be a hydraulic cement, chemically activated phosphate ceramic or geopolymer.

The disclosed cement-slurry compositions may also be pumped in remedial cementing applications, squeeze cementing in particular. This procedure involves pumping the composition into strategic locations such as casing leaks or voids behind the casing that have allowed hydraulic communication between strata. Fluid-loss control provided by the additive ensures that the cement slurry arrives and hardens at the correct location.

The following examples serve to further illustrate the invention. Most of the materials listed in the tables describing cement-slurry compositions are common products that are well known in the well-cementing industry. Less known are the lignosulfonate dispersant, available from Lignotech Inc., and the sodium alkylethersulfate surfactant, available from Akzo Nobel NV.

EXAMPLE 1

The effect of temperature on the ability of a paraffin-wax suspension (Michem Lube 743.E from Michelman, Inc.) to provide fluid-loss control was determined by testing the cement-slurry formulation given in Table 1.

TABLE 1

Slurry design for evaluating the effect of temperature on the fluid-loss-control performance of a paraffin-wax suspension.

| | |
|---|---|
| Slurry density | 1890 kg/m³ |
| Class G cement | 100% |
| Silicone antifoam | 2.7 L/metric ton of solid blend |
| Polynaphthalene sulfonate dispersant | 6.7 L/metric ton of solid blend |
| Paraffin wax suspension | 88.8 L/metric ton of solid blend* |
| Copolymer of acrylamido-methyl-propane sulfonate and acrylamide | 0.1% by weight of cement |
| Sodium alkylethersulfate surfactant | 0 or 4.4 L/metric ton of solid blend |

*88.8 L/metric ton corresponds to 19.3% by volume of the liquid phase in the cement slurry, or about 6.2% of solid wax by weight of the liquid phase of the cement slurry.

Michem Lube 743.E contains 32 wt % solids. The melting point of the paraffin-wax particles was 60° C., and the nominal particle size was 0.45 micrometer. After slurry preparation, fluid-loss measurements were performed in a static fluid-loss cell. Preparation and fluid-loss measurements were conducted in accordance with procedures described in ISO Publication 10426-2. The results are shown in Table 2.

TABLE 2

Fluid-loss control provided by paraffin-wax suspension as a function of temperature.

| Test Temperature (° C.) | Results | Calculated API Fluid Loss (mL) |
|---|---|---|
| 27* | 23 mL in 30 min | 45 |
| 80 | 39 mL in 16 min | 108 |

*Sodium alkylethersulfate surfactant not used.

The paraffin-wax suspension provided fluid-loss control at ambient temperature. At 60° C. the paraffin-wax particles became soft and deformable. At higher temperatures the paraffin wax liquefied, and fluid-loss control deteriorated.

EXAMPLE 2

The ability of a polyethylene-wax suspension to provide fluid-loss control at elevated temperatures was determined by testing ME91240.E from Michelman, Inc., whose properties are described in Example 2. The cement-slurry formulation is given in Table 4.

The ability of polyethylene-wax suspensions to provide fluid-loss control at ambient temperature was determined by testing two products: ME91240.E and ME93335.E, both from Michelman, Inc. ME91240.E contains 40 wt % solids. The polyethylene-wax particles in ME91240.E have a melting point of 125° C. and a nominal particle size of 0.125 micrometers. ME93335.E contains 35 wt % solids. The polyethylene-wax particles in ME93335.E have a melting point of 138° C. and a nominal particle size of 0.04 micrometers. The cement-slurry formulation is given in Table 3.

TABLE 3

Slurry design to evaluate the effect of temperature on the fluid loss control performance of polyethylene-wax suspensions.

| | |
|---|---|
| Density | 1890 kg/m³ |
| Class G cement | 100% |
| Silicone antifoam agent | 2.7 L/metric ton of solid blend |
| Polynaphthalene sulfonate dispersant | 6.7 L/metric ton of solid blend |
| Polyethylene-wax suspension | 88.8 L/metric ton of solid blend* |
| Copolymer of acrylamido-methyl-propane sulfonate and acrylamide | 0.1% by weight of cement |
| Sodium alkylethersulfate surfactant | 4.4 L/metric ton of solid blend |

*88.8 L/metric ton corresponds to 19.3% by volume of the liquid phase in the cement slurry. For ME91240.E and ME93335.E, the concentrations may also be expressed as about 6.7% and 7.7% of solid wax by weight of the liquid phase of the cement slurry, respectively.

EXAMPLE 3

The ability of a polyethylene-wax suspension to provide fluid-loss control at elevated temperatures was determined by testing ME91240.E from Michelman, Inc., whose properties are described in Example 2. The cement-slurry formulation is given in Table 4.

TABLE 4

Slurry design to evaluate the effect of temperature on the fluid loss control performance of a polyethylene-wax suspension.

| | |
|---|---|
| Density | 1890 kg/m³ |
| Class G cement | 100% |
| Silica flour | 35% by weight of cement |
| Silicone antifoam | 2.7 L/metric ton of solid blend |

TABLE 4-continued

Slurry design to evaluate the effect of temperature on the fluid
loss control performance of a polyethylene-wax suspension.

| | |
|---|---|
| Polynaphthalene sulfonate dispersant | 0.15% by weight of cement |
| Sodium glucoheptonate retarder | 0.45% by weight of cement |
| High-temperature lignosulfonate/gluconate retarder | 0.4% by weight of cement |
| Polyethylene wax suspension | 88.8 L/metric ton of solid blend* |
| Copolymer of acrylamido-methyl-propane sulfonate and acrylamide | 0.1% by weight of cement |
| Sodium alkylethersulfate surfactant | 4.4 L/metric ton of solid blend |
| Biopolymer anti-settling agent (welan gum) | 0.015% by weight of cement |

*88.8 L/metric ton corresponds to 21.0% by volume of the liquid phase in the cement slurry, or about 8.4% of solid wax by weight of the liquid phase of the cement slurry.

The cement slurry were prepared and tested in a stirred fluid-loss cell according to procedures described in ISO Publication 10426-2. The API fluid-loss rate at 85° C. was 22 mL. The API fluid-loss rate at 121° C. was 27 mL.

EXAMPLE 4

The ability of a polyethylene-wax suspension to provide fluid-loss control at temperatures close to the melting point was determined by testing ME91240.E from Michelman, Inc., whose properties are described in Example 2. The cement-slurry formulation is given in Table 5.

TABLE 5

Slurry design to evaluate the effect of temperature on the fluid
loss control performance of a polyethylene-wax suspension.

| | |
|---|---|
| Density | 1890 kg/m³ |
| Class G cement | 100% |
| Silica flour | 35% by weight of cement |
| Silicone antifoam | 2.7 L/metric ton of solid blend |
| High-temperature lignosulfonate/gluconate retarder | 0.36% by weight of solid blend |
| Lignosulfonate dispersant | 0.72% by weight of solid blend |
| Polyethylene wax suspension | 88.8 L/metric ton of solid blend* |
| Sodium alkylethersulfate surfactant | 4.4 L/metric ton of solid blend |
| Biopolymer anti-settling agent (welan gum) | 0.03% by weight of solid blend |

*88.8 L/metric ton corresponds to 21.2% by volume of the liquid phase in the cement slurry, or about 8.5% of solid wax by weight of the liquid phase of the cement slurry.

The cement slurries were prepared and tested in a stirred fluid-loss cell according to procedures described in ISO Publication 10426-2. The ISO fluid-loss results are shown in Table 6.

TABLE 6

Stirred fluid-loss measurements from a cement slurry containing
a polyethylene-wax suspension as a function of temperature.

| Test Temperature (° C.) | Stirred Fluid Loss (mL) | |
|---|---|---|
| | First test | Duplicate test |
| 110 | 52 | 41 |
| 120 | 13 | 14 |

Although various embodiments have been described with respect to enabling disclosures, it is to be understood the invention is not limited to the disclosed embodiments. Variations and modifications that would occur to one of skill in the art upon reading the specification are also within the scope of the invention, which is defined in the appended claims.

The invention claimed is:

1. A method for reducing fluid loss in a subterranean well, the well having a borehole wall, a formation and a bottomhole temperature, comprising:
    (i) preparing a composition comprising a process fluid and a particulate additive having a glass-transition temperature lower than the bottomhole temperature and a particle size smaller than 1 micrometer, and being composed of one material; and
    (ii) pumping the composition into the well, wherein, after injection into the well, the particulate additive becomes deformable at a temperature below the bottomhole temperature and migrates to the borehole wall, thereby forming a seal that reduces fluid ingress through the borehole wall and into the formation.

2. The method of claim 1, wherein the particulate additive is present at a concentration between about 1% and 25% by weight of the liquid phase of the process fluid.

3. The method of claim 1, wherein the glass-transition temperature of the additive, the melting temperature of the additive, or both is higher than or equal to 25° C.

4. The method of claim 1, wherein the additive is a wax or a thermoplastic.

5. The method of claim 4, wherein the additive is selected from the group consisting of paraffin wax, Fischer-Tropsch wax, polypropylene wax, polyethylene wax, Carnauba wax, polyethylene, polyetheretherketone, polyethersulfone and polytetrafluoroethylene.

6. The method of claim 1, wherein the process fluid comprises a hydraulic cement.

7. The method of claim 1, wherein the process fluid comprises a cement selected from one or more members of the group consisting of Portland cement, calcium aluminate cement, Class C fly ash, lime-silica mixtures, Portland cement-fly ash composites, Portland cement-blast furnace slag composites, Portland cement-zeolite composites, chemically activated phosphate ceramic cement and geopolymer.

8. The method of claim 1, wherein the process fluid is a cement slurry.

9. A method for using a particulate additive in a subterranean well having a borehole wall, a formation and a bottomhole temperature, the additive comprising a material whose glass transition temperature is lower than the bottomhole temperature and a particle size smaller than 1 micrometer, and being composed of one material, comprising:
    (i) preparing a process fluid comprising cement, water and the particulate additive; and
    (ii) pumping the process fluid into the subterranean well, wherein the particulate additive becomes deformable and migrates to a borehole wall, forming a seal that reduces fluid ingress through the borehole wall and into the formation.

10. The method according to claim 9, wherein the glass-transition temperature of the additive, the melting temperature of the additive, or both is higher than or equal to 25° C.

11. The method according to claim 9, wherein the additive is a wax or a thermoplastic.

12. The method of claim 11, wherein the additive is selected from the group consisting of paraffin wax, Fischer-Tropsch wax, polypropylene wax, polyethylene wax, Carnauba wax, polyethylene, polyetheretherketone, polyethersulfone and polytetrafluoroethylene.

13. The method of claim 9, wherein the process fluid has a liquid phase, and the particulate additive is present at a concentration between about 1% and 25% by weight of the liquid phase.

14. The method of claim 9, wherein the cement is a hydraulic cement, chemically activated phosphate ceramic or geopolymer.

* * * * *